(12) United States Patent
Li

(10) Patent No.: US 12,358,439 B1
(45) Date of Patent: Jul. 15, 2025

(54) FULL-ROTATION DASH CAM CAMERA ASSEMBLY

(71) Applicant: Zhengzhou Tiandehu Trading Co., Ltd., Henan (CN)

(72) Inventor: Zheng Li, Yunnan (CN)

( * ) Notice: Subject to any disclaimer, the term of this patent is extended or adjusted under 35 U.S.C. 154(b) by 0 days.

(21) Appl. No.: 19/024,393

(22) Filed: Jan. 16, 2025

(51) Int. Cl.
*B60R 11/04* (2006.01)
*B60R 11/00* (2006.01)

(52) U.S. Cl.
CPC ....... *B60R 11/04* (2013.01); *B60R 2011/0087* (2013.01); *B60R 2300/102* (2013.01); *B60R 2300/105* (2013.01)

(58) Field of Classification Search
CPC ............. B60R 11/04; B60R 2011/0087; B60R 2300/102; B60R 2300/105

USPC ....................................................... 348/148
See application file for complete search history.

(56) References Cited

U.S. PATENT DOCUMENTS

| 2016/0381292 | A1* | 12/2016 | Lu ........................ | B60R 11/0235 348/36 |
| 2019/0156667 | A1* | 5/2019 | Arshad ................ | G06V 20/582 |

\* cited by examiner

*Primary Examiner* — Nguyen T Truong

(57) ABSTRACT

This patent discloses a full-rotation dash cam camera assembly relevant to the field of dash cam technology. It features a dual rotation mechanism allowing two subsidiary camera units, located on either side of a main body, to freely rotate from 0° to 360° vertically and 0° to 180° horizontally. This hemispherical range of motion, in conjunction with the main body, enables comprehensive capture of images from specific locations inside or outside the vehicle, providing all-around monitoring to meet the comprehensive visual requirements of the driver.

7 Claims, 5 Drawing Sheets

FULL-ROTATION DASH CAM CAMERA ASSEMBLY

TECHNICAL FIELD

This invention pertains to the technology of dash cams, specifically a dash cam camera assembly capable of full rotation.

BACKGROUND OF THE PRESENT INVENTION

Existing dash cam cameras are generally fixed or have limited rotation capabilities, which restrict comprehensive image capture around the vehicle. For instance, fixed cameras cannot adjust to capture specific views inside or outside the vehicle, and cameras with limited rotation cannot fully meet the driver's needs for a comprehensive view.

Thus, there is a pressing need within the technology field to design a dash cam camera that can achieve 360° vertical and 180° horizontal free rotations to address these limitations.

SUMMARY OF PRESENT INVENTION

The objective of this application is to provide a full-rotation dash cam camera assembly designed to address the problems identified in the background technology.

To achieve the aforementioned objectives, this application proposes the following technical solution: A full-rotation dash cam camera assembly comprising a main body and a mounting base, where the main body is rotatably connected to the mounting base. The main body is connected on both sides through a vertical rotation mechanism to a rotary seat, which rotates 360° vertically;

Each rotary seat internally houses a subsidiary body connected through a horizontal rotation mechanism, enabling the subsidiary body to rotate 180° horizontally;

Additionally, the main body includes a locking mechanism designed to restrict the rotation direction of the rotary seats, enabling bi-directional 180° rotation.

Preferably, the main body includes a main casing and a primary camera fixed inside the main casing, with first slots on both sides of the main casing;

The rotary seat includes a rotary casing, and the vertical rotation structure includes a first disk, which is fixed to one side of the rotary casing. The middle part of the first disk rotates through the first slot forming a limiting ring, which is positioned inside the first slot and has a diameter greater than the internal diameter of the first slot.

Preferably, the rotary casing, on the side away from the first disk, forms a U-shaped mounting groove for the subsidiary body to rotate into, and the rotary casing has cavities formed at both its upper and lower ends. The top and bottom of the rotary casing are equipped with a second slot;

The subsidiary body includes a subsidiary casing and a subsidiary camera, with the subsidiary camera fixed within the subsidiary casing;

The horizontal rotation mechanism comprises a second disk, which rotates through the second slot and extends into the cavity of the rotary casing. The end of the second disk also forms a limiting ring larger than the internal diameter of the second slot.

Preferably, the inside of the main casing also features a limit slot connected to the first slot, where the limit ring of the first disk is rotationally mounted;

The locking mechanism includes a block and a stop block, with the block fixed to the side of the first disk and protruding outwards, and the stop block fixed within the limit slot;

When the first disk rotates 180° up or down, the block tightly contacts the stop block.

Preferably, the diameter of the second disk is smaller than the internal diameter of the second slot, and the second disk is fitted with a second rubber ring. The second disk is rotationally connected to the inside of the second slot through the second rubber ring;

The diameter of the first disk is smaller than the internal diameter of the first slot, and the first disk is fitted with a first rubber ring. The first disk is rotationally connected to the inside of the first slot through the first rubber ring.

Preferably, the upper part of the main casing is fixed with a connector head, and the mounting base includes a rotary plate and an adhesive plate. The rotary plate is rotatably connected to the connector head, and the adhesive plate is fixed to one side of the rotary plate, with the adhesive layer of the adhesive plate covered with easy-to-peel paper. The rotational connection between the rotary plate and the connector head can be adjusted and locked by a knob.

Preferably, the rotary casing is composed of two half-casings, which are aligned and connected by positioning posts. The first disk is composed of two semi-rings that correspond to the two half-casings of the rotary casing, with a connecting block fixed on the first disk, and the two semi-rings of the first disk are fixed together with bolts passing through the connecting block;

Additionally, a cable passage hole is located in the middle part of the ring formed by the two semi-rings of the first disk.

In summary, the technical effects and advantages of this invention include:

1. Through the rotation of the rotary seats and the subsidiary bodies, the two subsidiary bodies positioned on either side of the main body can achieve bi-directional free rotation of 0° to 360° vertically and 0° to 180° horizontally, with the range of rotation forming a hemispherical shape. This configuration allows the assembly to meet specific imaging needs inside or outside the vehicle, achieving comprehensive monitoring and fulfilling drivers' needs for a complete view;
2. The setup of the block and stop block restricts the rotational direction of the first disk, allowing it to rotate 180° up and down while preventing continuous rotation in one direction, which could damage cables connected to the subsidiary camera, thus ensuring stable connections of internal components of the dash cam camera;
3. The installation of the second and first rubber rings damps the rotation of the rotary seats and subsidiary bodies, allowing them to stay at any angle after rotation, ensuring the stability of the subsidiary bodies' orientation post-rotation without the need for additional fixation or locking structures. This simplifies the entire camera structure, reduces equipment costs, and is suitable for widespread adoption.

BRIEF DESCRIPTION OF THE DRAWINGS

To clarify the technical solutions in the examples of this application or in existing technology, a brief introduction to the drawings used in the description of these examples or existing technology is provided below. It is evident that the drawings described here are just some implementations for this application. Those skilled in the art can derive other drawings without creative effort based on these illustrations.

In the figures:
(1): Main body;
(11): Main casing;
(111): First slot;
(112): Limit slot;
(12): Primary camera;
(13): Connector head;
(2): Mounting base;
(21): Rotary plate;
(22): Adhesive plate;
(23): Adjustment knob;
(3): Rotary seat;
(31): Rotary casing;
(311): Second slot;
(312): Positioning post;
(32): First disk;
(321): Connecting block;
(322): Cable passage hole;
(323): Block;
(33): U-shaped mounting groove;
(34): First rubber ring;
(4): Subsidiary body;
(41): Subsidiary casing;
(42): Subsidiary camera;
(43): Second disk;
(44): Second rubber ring;
(5): Stop block.

DETAILED IMPLEMENTATION METHOD

The following describes the technical solution of the patent implementation example in detail, using the drawings. Clearly, the described examples are only a part of the implementation of this patent and not all examples. Based on the implementations in this patent, all other implementations obtained by those skilled in the field without creative effort fall within the scope of this patent protection.

Implementation Example

Figure 1:
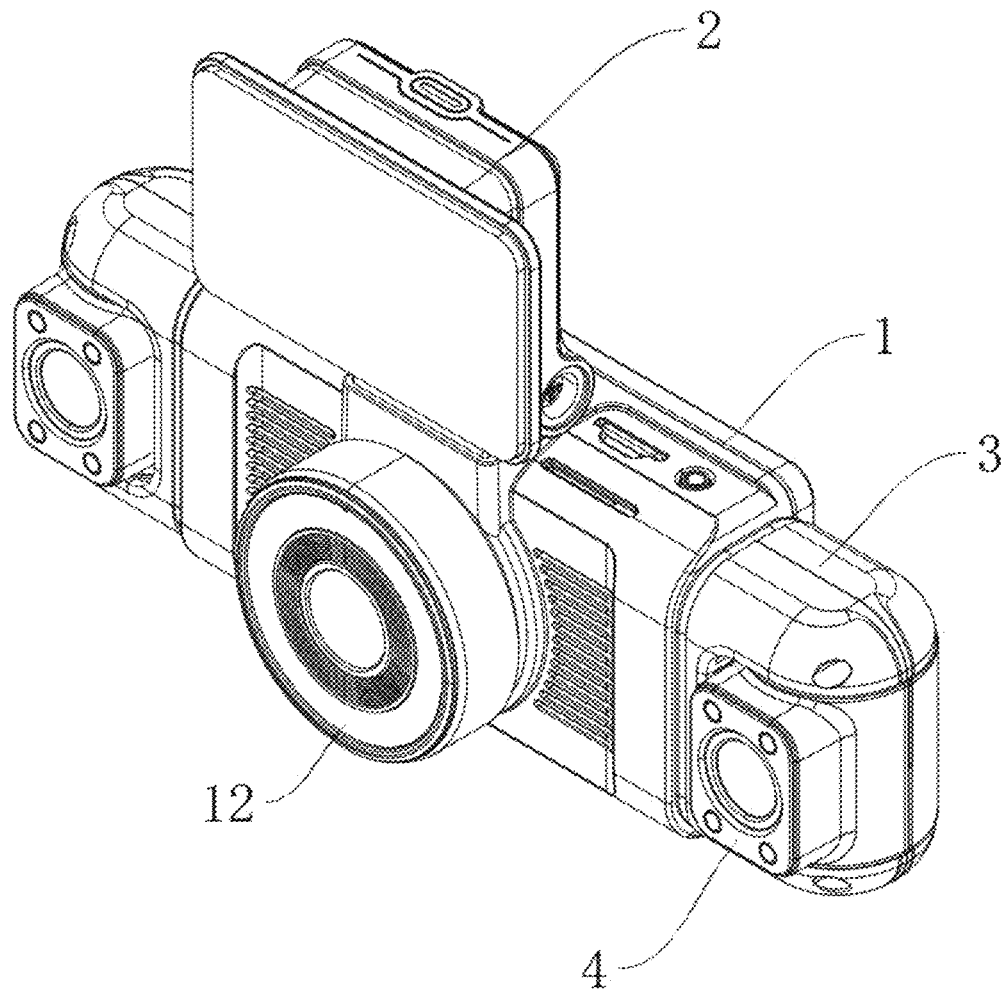
FIG. 1 shows a three-dimensional schematic of the implementation example.
Figure 2:
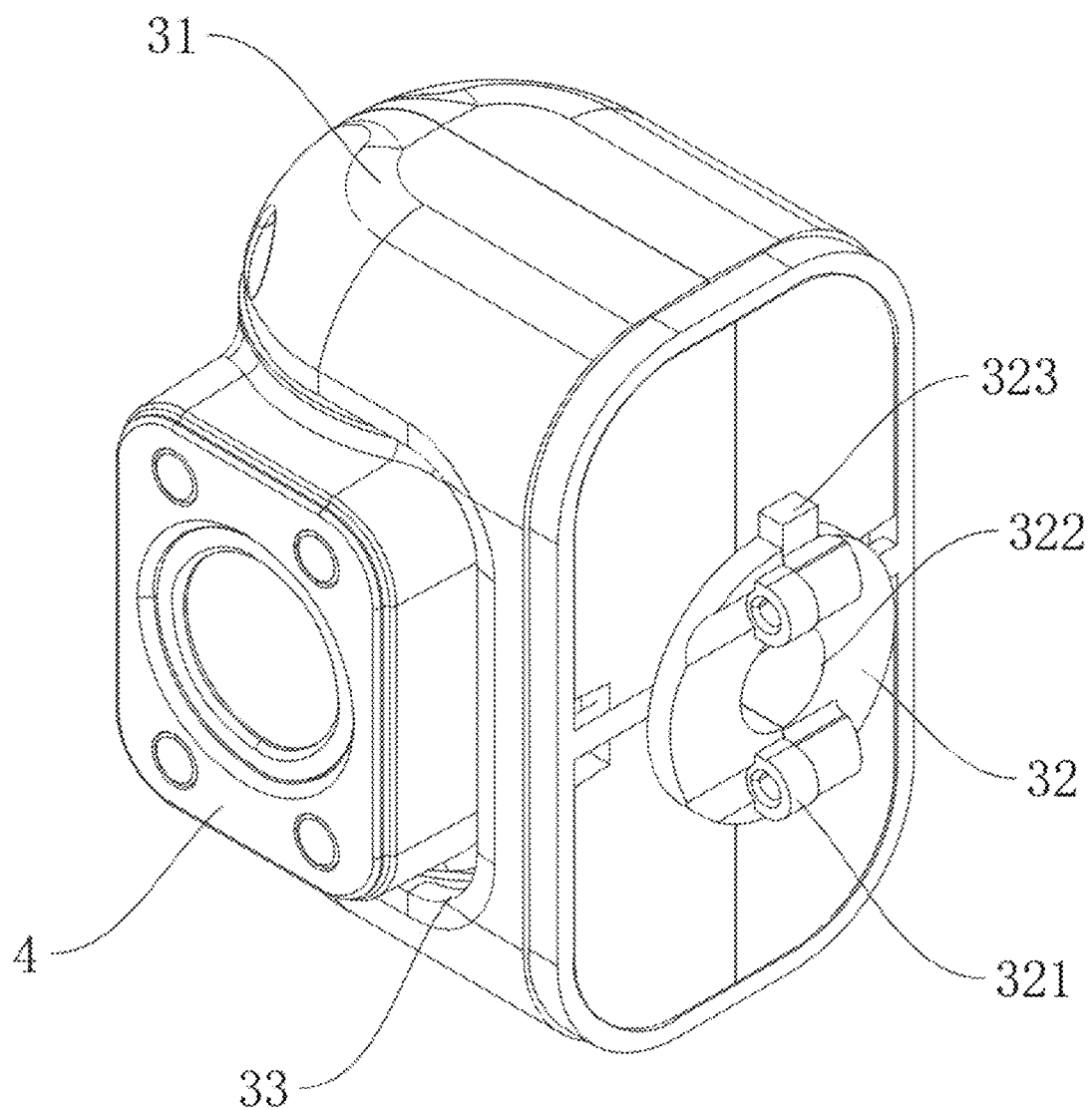
FIG. 2 illustrates the structure of the rotary seat and the subsidiary body.
Figure 3:
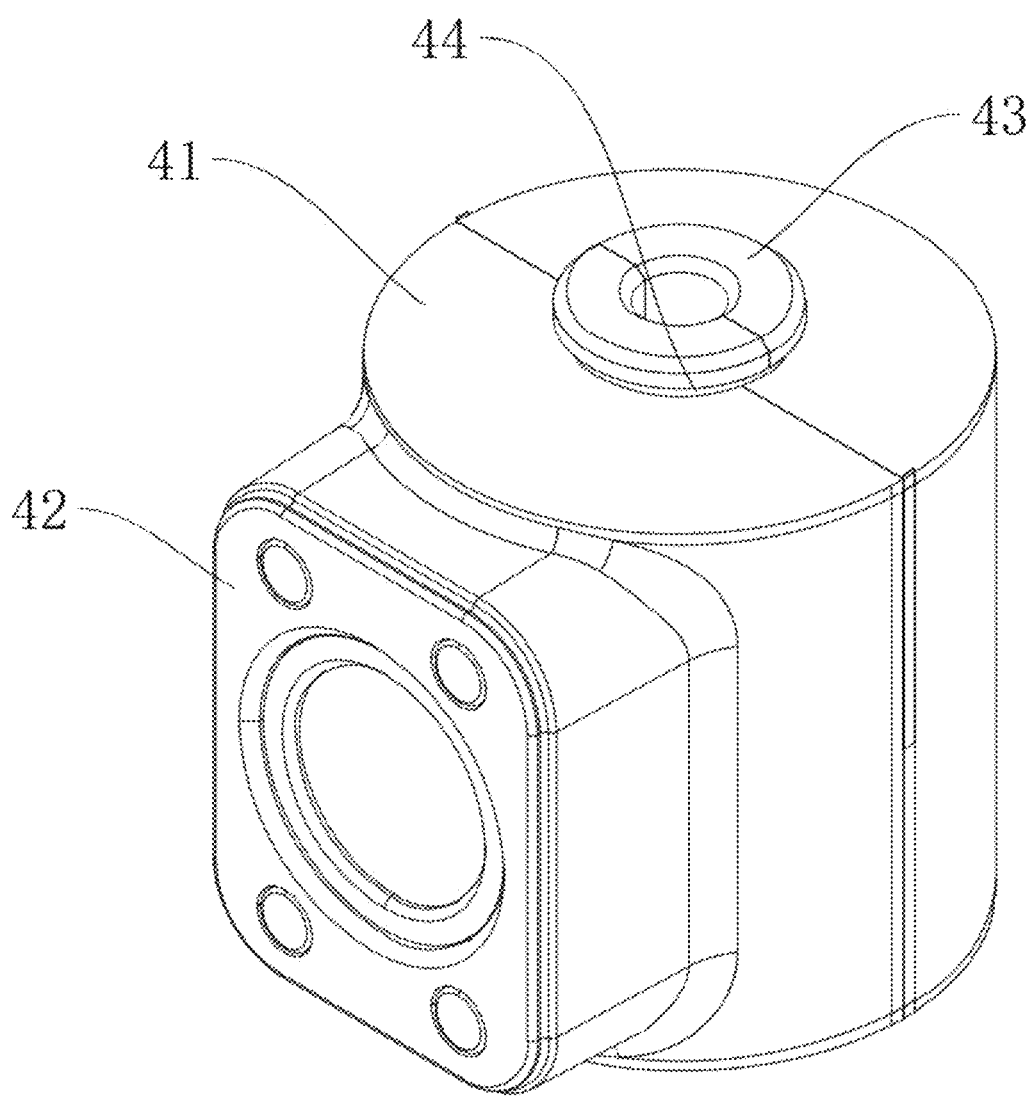
FIG. 3 details the structure of the subsidiary body.
Figure 4:
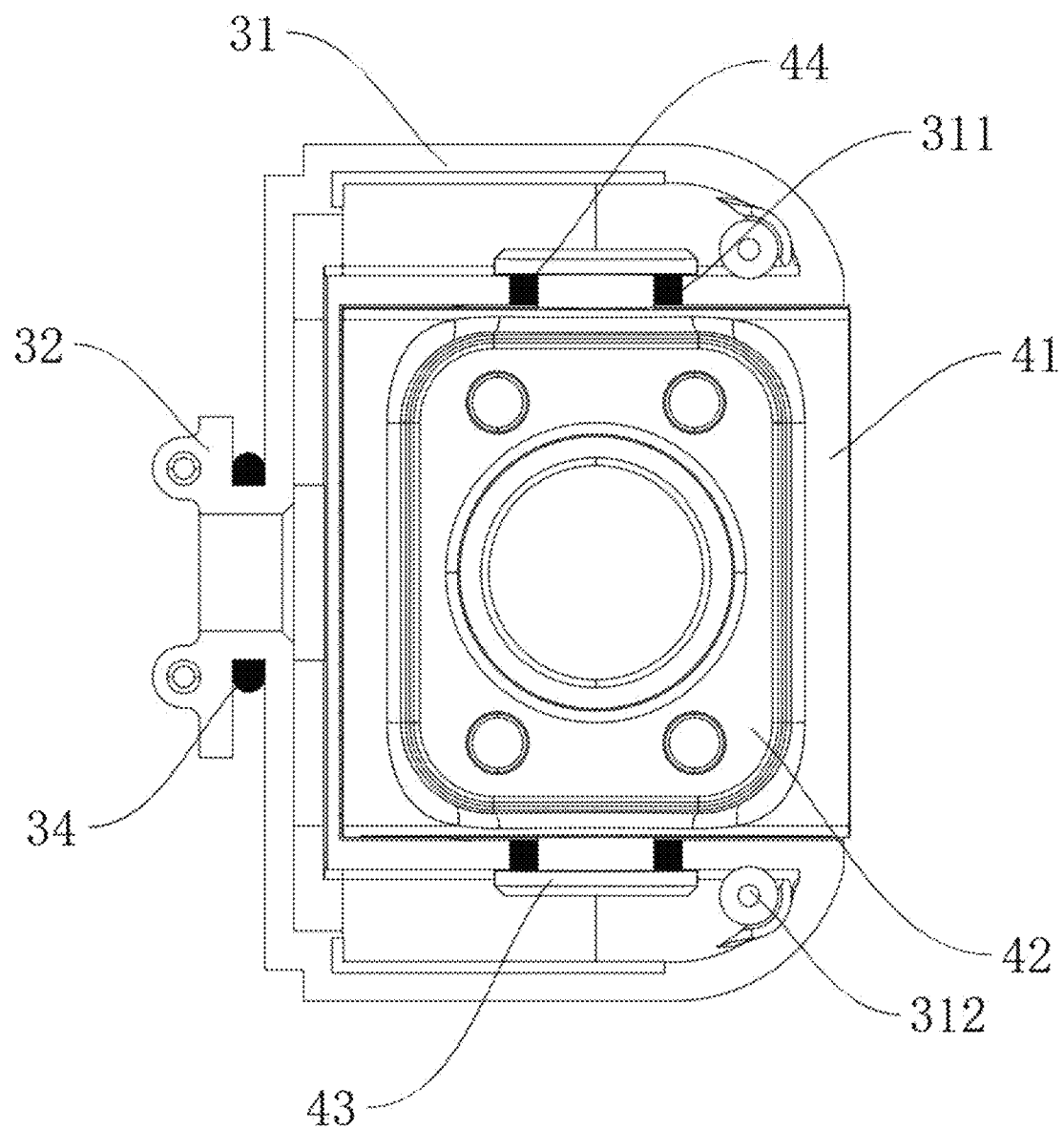
FIG. 4 presents a front view of the disassembled rotary seat and the subsidiary body.
Figure 5:
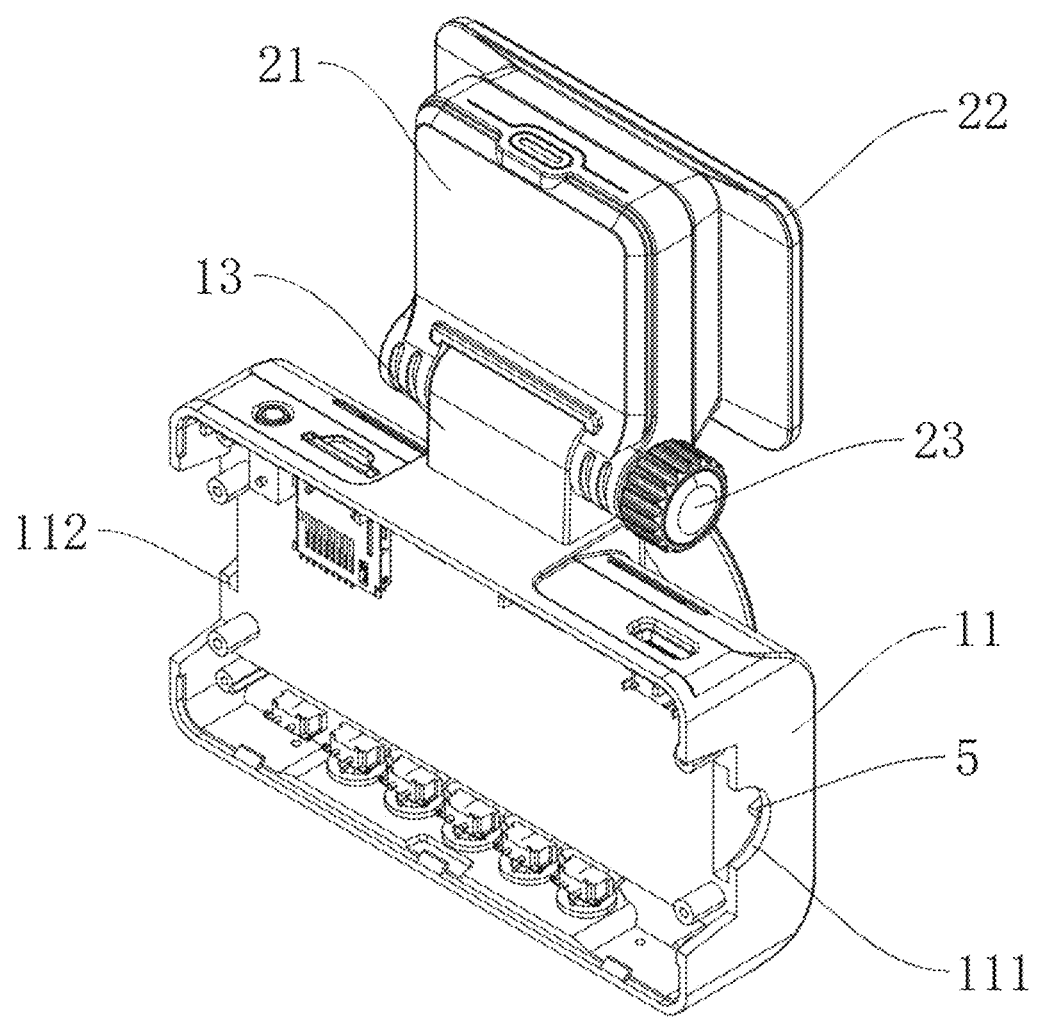
FIG. 5 depicts the structure of the main casing and the mounting base.

Referring to FIGS. 1-5, the full-rotation dash cam camera assembly includes a main body (1) and a mounting base (2), where the main body (1) and the mounting base (2) are rotatably connected. Both sides of the main body (1) are connected via vertical rotation mechanisms to rotary seats (3), which rotate 360° vertically;

Each rotary seat (3) internally houses a subsidiary body (4) connected via horizontal rotation mechanisms, allowing the subsidiary body (4) to rotate 180° horizontally;

The main body (1) also includes a locking mechanism designed to restrict the rotational direction of the rotary seats, enabling bi-directional 180° rotation.

Based on this structure, by rotating the rotary seats and the subsidiary bodies, the two subsidiary bodies located on either side of the main body can achieve 0° to 360° vertical and 0° to 180° horizontal bi-directional free rotation, with the rotation range forming a hemispherical shape, which allows it to meet specific imaging needs inside or outside the vehicle, achieving comprehensive monitoring and fulfilling drivers' comprehensive visual requirements;

Adjustments only require manual rotation, eliminating the need for motor drive, thereby reducing production costs, energy consumption, and failure rates.

Further, the main body (1) includes a main casing (11) and a primary camera (12) fixed within the main casing (11), with first slots (111) on both sides of the main casing (11);

The rotary seat (3) includes a rotary casing (31), with a vertical rotation structure comprising a first disk (32), which is fixed to one side of the rotary casing (31). The first disk (32) rotates through the first slot (111), forming a limit ring that is larger in diameter than the internal diameter of the first slot (111) and is located inside it.

The rotary casing (31), through the first disk (32) in conjunction with the first slot (111), achieves a rotational connection with the main casing (11), enabling the rotary seat (3) to produce a 360° rotation and simultaneously drive the subsidiary body (4).

Additionally, the rotary casing (31) forms a U-shaped mounting groove (33) on the side away from the first disk (32) for the subsidiary body (4) to pivot into, with cavities formed at both ends of the rotary casing (31). The rotary casing (31) is equipped with a second slot (311) at both its top and bottom;

The subsidiary body (4) comprises a subsidiary casing (41) and a subsidiary camera (42), with the subsidiary camera (42) fixed within the subsidiary casing (41);

The horizontal rotation mechanism includes a second disk (43), which rotates through the second slot (311) and extends into the cavity of the rotary casing (31), with the end of the second disk (43) also forming a limit ring that is larger than the internal diameter of the second slot (311).

The subsidiary casing (41), through the second disk (43) in conjunction with the second slot (311), achieves a rotational connection with the rotary casing (31), and due to the constraint of the U-shaped mounting groove (33), allows the subsidiary casing (41) to rotate within a 180° range. Combined with the rotation of the rotary casing (31), it enables any angle of rotation within a hemispherical surface, achieving comprehensive imaging capture around or inside the vehicle.

Further, the inside of the main casing (11) also features a limit slot (112) connected to the first slot (111), where the limit ring of the first disk (32) is rotationally mounted;

The locking mechanism includes a block (323) and a stop block (5), with the block (323) fixed to the periphery of the first disk (32) and protruding outward, and the stop block (5) fixed within the limit slot (112);

When the first disk (32) rotates 180° up or down, the block (323) tightly contacts the stop block (5).

The rotary casing (31) is composed of two half-casings, which are aligned and connected by positioning posts (312). The first disk (32) is composed of two semi-rings corresponding to the two half-casings of the rotary casing (31), with a connecting block (321) fixed on the first disk (32), and the two semi-rings of the first disk (32) are fixed together with bolts passing through the connecting block (321);

Additionally, a cable passage hole (322) is located in the middle part of the ring formed by the two semi-rings of the first disk (32).

By utilizing the block (323) and stop block (5), the rotational direction of the first disk (32) is restricted, allowing it to rotate 180° up and down while preventing continuous rotation in one direction, which could damage cables connected to the subsidiary camera, thus ensuring stable connections of internal components of the dash cam camera.

Further, the diameter of the second disk (43) is smaller than the internal diameter of the second slot (311), and the second disk (43) is fitted with a second rubber ring (44). The second disk (43) is rotationally connected to the inside of the second slot (311) through the second rubber ring (44);

The diameter of the first disk (32) is smaller than the internal diameter of the first slot (111), and the first disk (32) is fitted with a first rubber ring (34). The first disk (32) is rotationally connected to the inside of the first slot (111) through the first rubber ring (34).

By utilizing the second and first rubber rings, the rotary seats and subsidiary bodies are dampened during rotation, allowing them to remain stable at any angle within the hemispherical range after rotation, ensuring the orientation of the subsidiary bodies remains stable post-rotation without the need for additional fixation or locking structures. This simplifies the entire camera structure, reduces equipment costs, and is suitable for widespread adoption.

Further, the upper part of the main casing (11) is fixed with a connector head (13), and the mounting base (2) includes a rotary plate (21) and an adhesive plate (22). The rotary plate (21) is rotatably connected to the connector head (13), and the adhesive plate (22) is fixed to one side of the rotary plate (21), with the adhesive layer of the adhesive plate (22) covered with easy-to-peel paper. The rotational connection between the rotary plate (21) and the connector head (13) can be adjusted and locked by a knob (23), allowing for simple and quick installation of the full-rotation dash cam camera within a vehicle. After installation, it is easy to adjust the posture of the main body (1), making use more flexible and convenient.

Working Principle of the Invention

In daily use, the full-rotation dash cam camera can be easily installed by first removing the peel-off layer from the adhesive plate (22). The camera assembly can then be fixed onto the interior of the vehicle, making installation simple and convenient.

During use, the user can manually rotate the rotary seat (3) and subsidiary body (4), thereby adjusting the orientation of the subsidiary camera (42). This allows the two subsidiary bodies (4) to achieve bi-directional free rotation of 0° to 360° vertically and 0° to 180° horizontally, with the rotation range forming a hemispherical shape. The camera can be aligned with the main body (1) to meet the specific image capture needs inside or outside the vehicle, achieving comprehensive monitoring and fulfilling the driver's need for an all-around view.

Furthermore, the rotary seat (3) and subsidiary body (4) are damped during rotation, allowing them to remain fixed at any angle after rotation. This ensures the subsidiary body (4) maintains stable orientation post-rotation.

Adjustments can be made manually without the need for motor drive, reducing production costs, energy consumption, and failure rates. Additionally, there is no need for extra fixation or locking structures, simplifying the entire dash cam assembly. This design reduces equipment costs while meeting user needs, making it suitable for large-scale adoption.

FINAL NOTE

The above description provides preferred embodiments of the invention and is not intended to limit the scope of the patent. Although the invention has been explained in detail with reference to the embodiments, those skilled in the art can modify the described technical solutions or make equivalent substitutions without creative effort. Any modifications, equivalent substitutions, or improvements made within the spirit and principle of the invention should fall within the protection scope of the patent.

What is claimed is:

1. A full-rotation dash cam camera assembly, comprising a main body (1) and a mounting base (2), wherein the main body (1) is rotatably connected to the mounting base (2);

Characterized in that: each side of the main body (1) is connected via a vertical rotation mechanism to a rotary seat (3), and each rotary seat (3) rotates 360° vertically;

Each rotary seat (3) contains a subsidiary body (4) connected via a horizontal rotation mechanism, allowing the subsidiary body (4) to rotate 180° horizontally;

Additionally, the main body (1) is equipped with a two locking mechanisms that restrict the rotational direction of the rotary seats (3), enabling each of the rotary seats (3) to achieve bi-directional 180° rotation.

2. According to claim 1, a full-rotation dash cam camera assembly, characterized in that: the main body (1) includes a main casing (11) and a primary camera (12) fixed inside the main casing (11), with both sides of the main casing (11) having a first slot (111);

The rotary seat (3) comprises a rotary casing (31), and the vertical rotation mechanism includes a first disk (32), which is fixed to one side of the rotary casing (31);

The first disk (32) rotates through the first slot (111) forming a limit ring, which is located inside the first slot (111) and has a diameter greater than the internal diameter of the first slot (111).

3. According to claim 2, a full-rotation dash cam camera assembly, characterized in that: the rotary casing (31), on the side opposite the first disk (32), forms a U-shaped installation groove (33) for the subsidiary body (4) to rotate into;

The rotary casing (31) forms cavities at both its upper and lower ends, and has a second slot (311) at both its top and bottom; The subsidiary body (4) comprises a subsidiary casing (41) and a subsidiary camera (42), with the subsidiary camera (42) fixed inside the subsidiary casing (41);

The horizontal rotation mechanism includes a second disk (43), which rotates through the second slot (311) and extends into the cavity of the rotary casing (31), with the end of the second disk (43) also forming a limit ring larger than the internal diameter of the second slot (311).

4. According to claim 2, a full-rotation dash cam camera assembly, characterized in that: the inside of the main casing (11) also has a limit slot (112) connected to the first slot (111), and the limit ring of the first disk (32) is rotationally mounted within the limit slot (112);

The locking mechanism includes a block (323) and a stop block (5), with the block (323) fixed to the side of the first disk (32) and protruding, and the stop block (5) fixed within the limit slot (112);

When the first disk (32) rotates 180° up or down, the block (323) tightly contacts the stop block (5).

5. According to claim 3, a full-rotation dash cam camera assembly, characterized in that: the diameter of the second disk (43) is smaller than the internal diameter of the second slot (311), and the second disk (43) is fitted with a second rubber ring (44);

The second disk (43) is rotationally connected to the inside of the second slot (311) through the second rubber ring (44); The diameter of the first disk (32) is smaller than the internal diameter of the first slot (111), and the first disk (32) is fitted with a first rubber ring (34);

The first disk (32) is rotationally connected to the inside of the first slot (111) through the first rubber ring (34).

6. According to claim 2, a full-rotation dash cam camera assembly, characterized in that: the upper part of the main casing (11) has a connector head (13) fixed to it, and the mounting base (2) includes a rotary plate (21) and an adhesive plate (22);

The rotary plate (21) is rotatably connected to the connector head (13), and the adhesive plate (22) is fixed to one side of the rotary plate (21), with the adhesive layer of the adhesive plate (22) covered with easy-to-tear paper;

The rotational connection between the rotary plate (21) and the connector head (13) can be adjusted and locked by a knob (23).

7. According to claim 3, a full-rotation dash cam camera assembly, characterized in that: the rotary casing (31) is composed of two half-casings, which are aligned and connected by positioning posts (312);

The first disk (32) is composed of two semi-rings corresponding to the two half-casings of the rotary casing (31), with a connecting block (321) fixed on the first disk (32), and the two semi-rings of the first disk (32) are fixed together with bolts passing through the connecting block (321);

Additionally, a cable passage hole (322) is located in the middle part of the ring formed by the two semi-rings of the first disk (32).

\* \* \* \* \*